Sept. 11, 1962 R. G. POST 3,053,492
STORAGE PALLETS
Filed Sept. 30, 1960

*INVENTOR.*
RICHARD G. POST
BY
*Joseph F. Padlon*
ATTORNEY

United States Patent Office 3,053,492
Patented Sept. 11, 1962

3,053,492
STORAGE PALLETS
Richard G. Post, Essex Fells, N.J., assignor to Federal Industries, a Textron company, Belleville, N.J.
Filed Sept. 30, 1960, Ser. No. 59,569
5 Claims. (Cl. 248—120)

This invention relates to a suspension type moveable and transportable storage pallet. More particularly, it relates to a moveable storage pallet which can be lifted from the upper portion thereof, rather than from the bottom portion or base as heretofore, and which can be superimposed one above the other to facilitate and save storage space.

One of the important features of warehousing or storage of materials is that of efficient materials handling under such conditions so as to obtain desired results with a minimum of effect and the utilization of a minimum of space, thereby keeping the costs of an item down to a minimum.

With the above in view, it is an object of the present invention to provide a suspension type of pallet provided with sufficiently rigid and strong side pieces so as to permit easy lifting of the pallet when loaded, from the upper portion thereof.

Another object of the present invention is to provide a pallet which can be mounted, one above the other, forming several decks, so as to permit or facilitate storage within confined areas while at the same time utilizing to a maximum the space available in such area.

Another object of the present invention is to provide a pallet having sides the upper opposed parts of which readily accommodate a lifting member to permit easy removal of the pallet or superimposition thereof.

One other object of the present invention is to provide a removeable storage pallet which has reinforced sides, the upper portions of which are provided with open housing means for permitting the insertion thereinto and holding of the lifter members or fork members of a lifter unit or machine.

A still further and more specific object of the present invention is to provide a storage pallet comprising a framework which has side members forming walls and a bottom portion forming a floor and providing an area for accommodating a plurality of cylindrical members or rolls of material, whether textile or other type of material, and which pallet can be stored and readily removed by transshipment or by movement into any desired area, the side walls of said pallet containing reinforcing sections which are adapted to accommodate the lifting member of a hoisting device so as to readily carry a multiple number of such pallets in any desired direction, and for lifting the same within a truck for transportation to another area away from the source of supply.

Other objects and features of the present invention will become apparent from the following detailed description taken in conjunction with the accompanying drawings, in which FIG. 1 is an end view of a preferred embodiment of the present invention;

Figure 1:
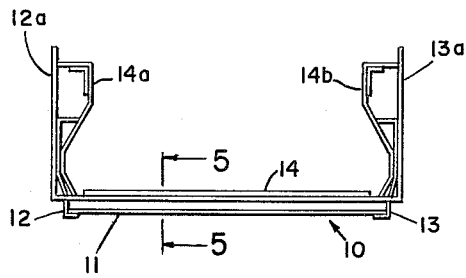
Figure 2:
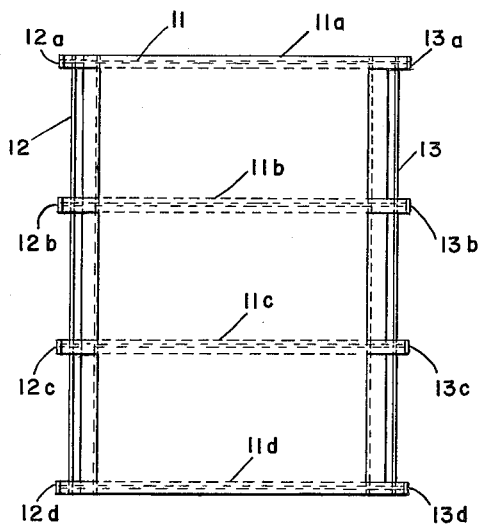
FIG. 2 is a top plan view of FIG. 1.
Figure 3:
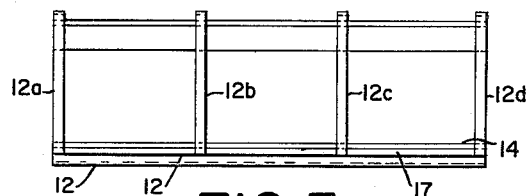
FIG. 3 is a side view of FIG. 1.

Referring now to the drawings wherein like reference numerals refer to like parts throughout, it will be noted that the invention comprises a storage pallet 10 having a bottom or base frame section 11 containing parallel side pieces or members 12 and 13. Said base section has a series of cross pieces 11a, 11b, 11c, and 11d from which extend upwardly extending parallel side pieces 12a, 12b, 12c, 12d, 13a, 13b, 13c, and 13d respectively. Said upward pieces may be joined to the cross pieces by spot welding or other suitable fastening means. It will be noted that said cross pieces are of any suitable structural material such as angle or channel iron and are also interconnected with a flat stock member 14 so as to afford rigidity to the base. Furthermore, as indicated, said cross pieces are spot welded or the like to the side long pieces 12 and 13, thus forming a firm support as a base. Said side pieces 12 and 13 are also provided with flat stock 15 with upper reinforcing stock or pieces 16.

Figure 4:
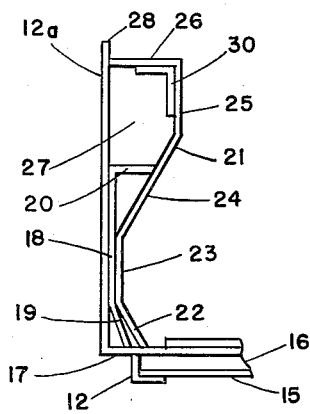
FIG. 4 is an enlarged detailed view of the left end portion shown in FIG. 3.
Figure 6:
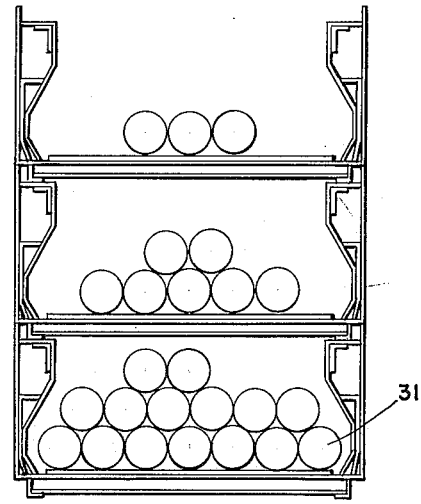
FIG. 6 represents an end view showing the embodiment of the present invention stacked in decks so as to permit easy stacking and efficient use of storage space.
Figure 5:
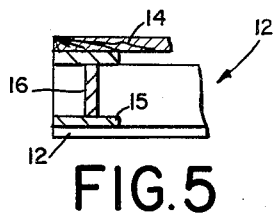
FIG. 5 is an enlarged view of a detail taken on 5—5 of FIG. 1.

Said cross pieces 11a, 11b, 11c and 11d as indicated are each provided with an upright bent portion so that at their upward bend they have extensions 17 beyond the end of the longitudinal side pieces 12 and 13 as shown in FIGURE 4. There are provided a sufficient number of such upwardly extending members to form a firm and rigid base. Such extending portions 17 overlap thus, forming a means for resting on a construction of similar formation as shown in FIGURE 6.

As a means of reinforcement for each of said members 12 and 13 there is provided for each upwardly extending members 12a, 12b, 12c, 12d, 13a, 13b, 13c, and 13d respectively, a reinforcing member 18 which extends upwardly at an incline 19 from the cross members 11a, 11b, 11c, and 11d and are provided with a right angled bend 20 so as to be attached to or forming part of each upwardly extending pieces 12a, 12b, 12c, and 12d, said right angled bend being inwardly of each upright member of the device as shown in FIG. 4 of the drawings. Said member 18 is attached to each upwardly extending piece by any suitable means of reinforcement such as spot welding or riveting or bolt means. There is further provided for each upright, another member 21 of flat stock material having a number of bent sections such as shown in FIG. 4. Said member 21 consisting of an inclined connecting section 22 which is fixed at its end to the bottom cross pieces, an upwardly extending vertical section 23 fixed to member 18, an inwardly inclined section 24 which is in contact with and supports the right angled bend 30, a vertically extending section 25, which in turn is bent at right angles towards the upwardly extending inward piece to form a section 26. These are each spot welded to upper vertically extending members 12a, 12b, 12c and 12d respectively, thus forming an opening 27 which is adapted to hold the respective prong of a fork lifting truck or other means, not shown, whereby the unit as made, is lifted, not from the lower portion, but from the upper portion thereof. Furthermore, said side section 26 for each upright is so constructed that there is left a vertical extension 28 forming a side as a guide and side piece section 26 as a support as will hereinafter be more fully described and as shown in FIGURE 6 of the drawings.

It is to be noted that the description of one side of the device applies also to the corresponding opposite side of the device, since both sides are of the same type of material and joined in the same manner. Said side piece section 27 is further provided with a horizontally extending right angled reinforcing member 30 which acts as a guide for the prongs of the lifting fork when the pallet is to be moved or placed in any suitable storage area. Also, this member 30 prevents the prongs of the lifting fork from damaging any rolls 31 housed in the pallet.

From the construction disclosed hereinabove, it will be noted that there is provided a reinforced pallet for accommodating the prongs of a lifting device. Said pallet at the same time provides a rigid framework which is adapted to contain a plurality of rolls of suitable textile, fabric or like material which may be either stored or transported. Furthermore, the particular type of pallets disclosed and illustrated herein can be transported on any ordinary flatcar or type of truck or vehicle wherein these can be placed in the vehicle in groups of two alongside each other, and decked one above the other to as many as four decks as shown in FIGURE 6 of the drawings. It will also be noted that when there is a plurality of these units stacked one above the other, and it is desired to move them, the respective prongs of the lifting truck are inserted into the respective accommodating side piece section 27 of the pallet. In this manner the pallets can be easily transported or moved without producing too heavy a strain on the forks of the lifting truck. Also, the sides of the pallet are provided with sheets of cardboard of plywood 14, 14a and 14b, on the sides and as a floor as to form a reinforcement for the floor and the side and to protect the rolls of the material which are contained by the pallet. A type of pallet made in accordance with the present invention is readily stacked and can be moved in groups, one above the other. Such type of pallet is notably economically made, but is rigid and of strong construction, thereby acting not only for material handling, but also as a storage container for different types of rolled material.

As shown, the device is adapted to hold nine rolls of material, each of which weighs between 150–200 pounds, thus affording a rigid and strong container for such rolls. The type of lift truck that can be used in this connection may be provided with any type of forks whether they are of the Hyster or Clark lifter type of truck. A roll of 8–10" in diameter weighs between 90–125 lbs.

While a preferred form of the embodiment has been disclosed and illustrated, it is to be noted that various changes may be made as to form, use of material, and arrangement of parts without departing from the scope of the invention as claimed herein.

I claim:

1. A moveable storage frame apparatus comprising a base portion, members extending vertically from the sides on said base, reinforcing means on each side of the apparatus intermediate the base and vertically extending means, another reinforcing member for each of said vertically extending means interconnecting the vertically extending means with the base and having reinforcing right angled means at its upper portion attached to the vertically extending means, thus forming a free receptive area of the vertically extending means for accommodating prongs of a lift truck and horizontally extending reinforcing means in said last means.

2. Apparatus according to claim 1 wherein the base and vertically extending members form horizontally extending recesses on each side of the base to permit superposition of the base over a similar apparatus.

3. Apparatus according to claim 2, in which the vertically extending members and said second reinforcing members form a continuous longitudinal retaining area permitting lifting of the apparatus, and having right angle bends forming a reinforcing longitudinally extending member.

4. A moveable storage pallet comprising a base having a pair of horizontally extending spaced parallel members of angle iron, a plurality of cross connecting members extending between said parallel members, each of said cross members having upwardly extending portions, means interconnecting the upwardly extending portions with the horizontally extending parallel members, a reinforcing member fixed to the upwardly extending and cross extending members, another upwardly extending reinforcing member for said upwardly extending member and cross members and base, said last named member having an inwardly bent portion connected with the upwardly extending portion short of its edge thereof, and a reinforcing angle iron member extending through all of the upwardly extending members at right angles to form a rigid connection therewith, and forming connecting means for attachment to a superimposed pallet of the same construction.

5. A pallet construction according to claim 4, in which the base is provided with a flooring and the upwardly extending connecting members are provided with side walls, and the upward portions of the upwardly extending members are so set as inwardly to form a continuous horizontally extending area on the side of the base and at the top of the extending members to provide a pair of retention areas.

References Cited in the file of this patent

UNITED STATES PATENTS

| | | |
|---|---|---|
| 1,832,772 | Hallowell | Nov. 17, 1931 |
| 2,046,095 | Shaw | June 30, 1936 |
| 2,632,567 | Richtmyer | Mar. 24, 1953 |
| 2,775,360 | Phillips | Dec. 25, 1956 |
| 2,778,590 | Jeannero | Jan. 22, 1957 |